UNITED STATES PATENT OFFICE.

JAMES DUNCAN, OF LONDON, JOHN A. R. NEWLANDS, OF KNOLL ROAD, BRIXTON, AND BENJAMIN E. R. NEWLANDS, OF LONDON, ENGLAND.

IMPROVEMENT IN TREATING SACCHARINE SOLUTIONS IN THE MANUFACTURE OF SUGAR.

Specification forming part of Letters Patent No. 149,731, dated April 14, 1874; application filed February 4, 1874.

*To all whom it may concern:*

Be it known that we, JAMES DUNCAN, of Mincing Lane, in the city of London, sugar-refiner, JOHN ALEXANDER REINA NEWLANDS, of Knoll Road, Brixton, in the county of Surrey, analytical chemist, and BENJAMIN EDWARD REINA NEWLANDS, of Clyde Wharf, Victoria Docks, London, analytical chemist, all in the Kingdom of England, have invented Improvements in the Treatment of Saccharine Solutions in the Manufacture of Sugar, of which the following is a specification:

In the manufacture of sugar from certain sources, such, for example, as beet-root, sirups are formed containing, among other impurities, large quantities of salts or compounds of potash, together with small quantities of salts or compounds of ammonia. It is well known that the presence of these salts or compounds prevents the separation of a considerable portion of the crystallizable sugar by the usual process of crystallization.

Now, this invention has for its object the removal of the potash contained in these potash salts or compounds, and also of the ammonia contained in the ammoniacal salts or compounds which may be present in the saccharine solutions. For this purpose we add to the saccharine solutions tartaric acid, or a solution of an acid tartrate, (by preference acid tartrate of soda,) in such proportions as shall be sufficient to convert the potash into acid tartrate of potash and the ammonia into acid tartrate of ammonia. The solution is then well agitated, artificially cooled, if necessary, and the precipitate, which consists of the acid tartrate of potash, or of the acid tartrate of ammonia, with occasionally tartrate of lime, is allowed to subside. We prefer to use tartaric acid instead of acid tartrate of soda, as this latter salt would introduce soda in the place of the potash removed. The saccharine solutions from which the potash, ammonia, and lime have been thus removed, either wholly or in part, may be submitted to the process of dialysis, as is well understood; or sufficient lime may be added so as to render the saccharine solution neutral, the precipitate, if any, be then allowed to settle, and the resulting sirup be treated as in the ordinary process of manufacturing sugar. Any excess of lime which may have been added in this last operation may be removed, in the usual way, by means of carbonic acid.

In any of the above operations where a precipitate results, such precipitate may be separated by filtration, decantation, or otherwise.

The second part of this invention has for its object the removal of the potash and ammonia contained in the salts or compounds of potash and of ammonia, before referred to, which may be present in saccharine solutions, in the following manner: For this purpose we add to the saccharine solutions sulphate of alumina, in proportion, by preference, sufficient to form an alum with the whole of the potash or ammonia present. The solution is then well mixed, artificially cooled, if necessary, and the alum allowed to crystallize out. Should the original sirup not contain sufficient sulphuric acid to combine with the whole of the potash and ammonia present, we add sufficient sulphate of alumina, sulphate of magnesia, or sulphuric acid, so as to convert any potash or ammonia which may exist in other forms into sulphates.

Unless the production of molasses be desired, we avoid the use of sulphuric acid from its known tendency to convert the crystallizable sugar into uncrystallizable.

Instead of employing sulphate of alumina, as before described, we sometimes prefer to employ a solution containing sulphate of alumina and phosphoric acid, resulting from the treatment of any phosphate of alumina, either native or artificial, with sulphuric acid. The amount of alumina in such solution having been first ascertained, sufficient of the solution is added, so as to form an alum with the potash and ammonia present in the saccharine solution.

In any of the above processes, after the removal of the alum, where a saccharine solution remains containing alumina or phosphoric acid, or both, we prefer to add lime in sufficient quantity so as to precipitate these substances. Any excess of lime which may have been added in this last operation may be removed, in the usual manner, by means of carbonic acid.

In any of the above operations where a precipitate results, such precipitate may be separated by filtration, decantation, or otherwise.

We claim—

1. The mode of effecting the separation of the potash and ammonia existing as salts or compounds in saccharine solutions by the employment of tartaric acid, or of acid tartrates, such, for example, as the acid tartrate of soda, substantially as described.

2. The mode of effecting the separation of the potash and ammonia existing as salts or compounds in saccharine solutions by the employment of sulphate of alumina, or of a solution of phosphate of alumina in sulphuric acid, substantially as described.

In witness whereof we have signed our names to this specification in the presence of two subscribing witnesses.

JAMES DUNCAN.
JOHN ALEXANDER REINA NEWLANDS.
BENJAMIN EDWARD REINA NEWLANDS.

Witnesses to the signatures of JOHN ALEXANDER REINA NEWLANDS and BENJAMIN EDWARD REINA NEWLANDS:

CHAS. MILLS,
   47 *Lincoln's Inn Fields, London.*
J. W. FRIGOT,
   *Consulate General, U. S. A., London.*

Witnesses to the signature of JAMES DUNCAN:

JNO. WILSON,
GUSTAVE DAWS.